United States Patent
Kim et al.

(10) Patent No.: US 8,852,708 B2
(45) Date of Patent: Oct. 7, 2014

(54) VACUUM INSULATION MEMBER, REFRIGERATOR HAVING VACUUM INSULATION MEMBER, AND METHOD FOR FABRICATING VACUUM INSULATION MEMBER

(75) Inventors: Youngbae Kim, Changwon-si (KR); Dongju Jung, Changwon-si (KR); Ilseob Yoon, Changwon-si (KR); Minjyu Hwang, Changwon-si (KR); Jinwoo Shim, Changwon-si (KR); Kyungdo Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 147 days.

(21) Appl. No.: 13/386,769

(22) PCT Filed: Aug. 6, 2010

(86) PCT No.: PCT/KR2010/005176
§ 371 (c)(1),
(2), (4) Date: Jan. 24, 2012

(87) PCT Pub. No.: WO2011/016696
PCT Pub. Date: Feb. 10, 2011

(65) Prior Publication Data
US 2012/0118898 A1    May 17, 2012

(30) Foreign Application Priority Data
Aug. 7, 2009   (KR) .................. 10-2009-0072991

(51) Int. Cl.
*F16L 59/065*   (2006.01)
*E04B 1/90*     (2006.01)
*F16L 59/07*    (2006.01)

(52) U.S. Cl.
CPC ........... *F16L 59/065* (2013.01); *F25D 2201/14* (2013.01); *F16L 59/07* (2013.01)
USPC .......................................................... 428/69

(58) Field of Classification Search
CPC ............................ F16L 59/065; E04B 1/803
USPC .......................................................... 428/69
See application file for complete search history.

(56) References Cited

U.S. PATENT DOCUMENTS 3,152,033 A  * 10/1964  Black et al. .................. 428/138
2006/0263571 A1* 11/2006  Tsunetsugu et al. ........... 428/69

FOREIGN PATENT DOCUMENTS

| JP | 05-331924 A    |   | 12/1993 |
| JP | 2002062878 A   | * | 2/2002  |
| JP | 2004-011705 A  |   | 1/2004  |
| JP | 2005-220954 A  |   | 8/2005  |
| JP | 2006-384852 A  |   | 12/2006 |

OTHER PUBLICATIONS

International Search Report and Written Opinion dated Mar. 21, 2011 issued in Application No. PCT/KR2010/005176.

* cited by examiner

*Primary Examiner* — Alexander Thomas
(74) *Attorney, Agent, or Firm* — Ked & Associates, LLP

(57) ABSTRACT

Disclosed is a vacuum insulation member having a uniform insulation thickness, a refrigerator having a vacuum insulation member, and a method for fabricating a vacuum insulation member. The vacuum insulation member includes: an envelope having gas impermeability and having a certain decompressed space therein; and a core including a plurality of laminated mesh members to support the envelope at an outer side of the envelope.

17 Claims, 4 Drawing Sheets

VACUUM INSULATION MEMBER, REFRIGERATOR HAVING VACUUM INSULATION MEMBER, AND METHOD FOR FABRICATING VACUUM INSULATION MEMBER

TECHNICAL FIELD

The present invention relates to a vacuum insulation member, a refrigerator having a vacuum insulation member, and a method for fabricating a vacuum insulation member, and more particularly, to a vacuum insulation member having a uniform insulation thickness, a refrigerator having a vacuum insulation member, and a method for fabricating a vacuum insulation member.

BACKGROUND ART

In general, a vacuum insulation member is a sort of insulator decompresses an internal s pace into a vacuum state to thus use the characteristics of low thermal conductivity of vacuum. The vacuum insulation member may be implemented in the form of a panel having a certain thickness.

The vacuum insulation panel may be configured to include an envelope forming a certain space therein and a core accommodated at an inner side of the envelope and supporting such that the envelope to maintain the certain space. In addition, a getter for absorbing an internal gas of the envelope may be provided at the inner side of the envelope.

The envelope (e.g., a film), serving to maintain an internal vacuum degree of the vacuum insulation member at a certain level, is formed of a film formed by laminating multi-layered polymers and aluminum, or the like.

As the core, glass fiber, silica core, or the like, is used. Among them, glass fiber is commonly used because its excellent initial performance is excellent and its cost is low. However, glass fiber needs a preprocessing and has weak durability.

The getter is a sort of aspirator or an absorbent for absorbing gas and/or moisture which is present at the inner side of the envelope or newly introduced.

In the related art vacuum insulation member, in order to maintain an internal vacuum degree at a pre-set level, much cost and efforts are required to fabricate an envelope, increasing the cost. In addition, because the core is formed of glass fiber, it is not easy to handle the core, and in order to insert the core into the interior of the envelope, the core needs to undergo a preprocessing (e.g., hot pressing or needle punching) in order to reduce the volume and size of the core. This results in problems in that the cost increases, much time is required, and the productivity is degraded.

In addition, because glass fiber is used as the core at the inner side of the envelope, and in this case, a relatively high vacuum degree must be maintained in terms of glass fiber, so much equipment, time and efforts are required. In order to maintain the interior of the envelope at a very high vacuum degree, a film formed by laminating a metal (e.g., aluminum) having a very low air permeability is used. However, a heat transmission is generated through the metal (aluminum)-laminated layer, degrading the performance.

DISCLOSURE OF INVENTION

Technical Problem

In spite of the efforts for fabricating the envelope as described above, in the related art vacuum insulation member, it is difficult to fabricate it because the internal vacuum degree must be maintained to be relatively high, and also, because the vacuum degree is damaged to a certain degree (about 0.1 Torr/year) after the fabrication, it is difficult to maintain the internal vacuum degree. Thus, the insulation performance is not properly maintained to shorten the life span.

Also, because the vacuum insulation member has a non-uniform thickness, making it difficult to obtain a uniform insulation thickness. This results in a problem in which the thickness of an insulation wall increases overall.

In addition, after the vacuum insulation member is fabricated, the surface of the envelope is creased, making the surface of the envelope uneven, so a defective attachment (or bonding) problem arises when the vacuum insulation member is bonded to an object.

Solution to Problem

Therefore, in order to address the above matters, the various features described herein have been conceived.

An aspect of the present invention provides a vacuum insulation member capable of simplifying a preprocessing process of a core, a refrigerator having the vacuum insulation member, and a method for fabricating the vacuum insulation member.

Another aspect of the present invention provides a vacuum insulation member capable of easily maintaining an internal vacuum degree and lengthening a life span, a refrigerator having the vacuum insulation member, and a method for fabricating the vacuum insulation member.

Another aspect of the present invention provides a vacuum insulation member capable of obtaining a uniform thickness, a refrigerator having the vacuum insulation member, and a method for fabricating the vacuum insulation member.

Another aspect of the present invention provides a vacuum insulation member capable of restraining a generation of creases on an outer surface and reducing a defective attachment, a refrigerator having the vacuum insulation member, and a method for fabricating the vacuum insulation member.

According to an aspect of the present invention, there is provided a vacuum insulation member including: an envelope having gas impermeability and having a certain decompressed space therein; and a core including a plurality of laminated mesh members to support the envelope at an outer side of the envelope.

Each of the mesh members may include a plurality of first wires disposed to be parallel to each other; and a plurality of second wires disposed to be parallel to each other and crossing the first wires.

The first wires and the second wires may be made of a synthetic resin material.

The first wires and the second wires may be configured to be in point-contact with each other.

The first wires and the second wires may be configured to be alternately disposed along a vertical direction.

The first wires and the second wires may include a metal part disposed at the center and a synthetic resin part coated on an outer surface of the metal part.

Each of the mesh members may include a fixing part for fixing the first wires and the second wires.

The vacuum insulation member may further include: a getter for absorbing a gas at an inner side of the envelope.

An internal vacuum degree of the envelope may range from $10^{-4}$ Torr to $10^{-2}$ Torr.

The envelope may include a film main body and a metal laminating film including a laminated layer formed by laminating a metal on a surface of the film main body.

The vacuum insulation member may further include a filter formed as powder having micro pores and filled at the inner side of the envelope.

Here, the filter may include at least one of $SiO_2$, $TiO_2$, and $Al_2O_3$.

The filter may include any one of aerogel and fumed silica.

An internal vacuum degree of the envelope may range from $10^{-1}$ Torr to 10 Torr.

In this case, the envelope may be configured to include a film main body and a deposition film including a deposition layer formed by depositing a metal or an inorganic material on an outer surface of the film main body.

According to another aspect of the present invention, there is provided a refrigerator having the vacuum insulation member.

According to another aspect of the present invention, there is provided a method for fabricating a vacuum insulation member, including: forming an envelope having gas impermeability and a plurality of mesh members; laminating the plurality of mesh members at an inner side of the envelope; and decompressing the interior of the envelope in order to maintain the interior of the envelope at a certain vacuum degree.

According to another aspect of the present invention, there is provided a method for fabricating a vacuum insulation member, including: forming an envelope having gas impermeability and a plurality of mesh members; laminating the plurality of mesh members at an inner side of the envelope; inserting a filler formed as powder having micro pores into the interior of the envelope; and decompressing the interior of the envelope in order to maintain the interior of the envelope at a certain vacuum degree.

Advantageous Effects of Invention

According to exemplary embodiments of the present invention, because the core formed by laminating the mesh members which can maintain a certain shape is provided, the use of a glass fiber core which needs to under a preprocessing process, for which much equipment and time are required, can be avoided, and thus, the fabrication can be facilitated and the fabrication cost can be reduced.

In addition, because the core formed by laminating the mesh members and the filler formed as powder having micro pores are provided at the inner side of the envelope, the internal vacuum degree required for an insulation performance can be lowered to $10^{-1}$ Torr to 10 Torr. Thus, equipment (the number of vacuum pumps) required for the internal vacuum degree and a tact time can be considerably reduced. Accordingly, the fabrication can be quickly and easily performed, and the fabrication cost can be significantly reduced.

In addition, because the envelope is configured to be supported by the core including the mesh members, the completed vacuum insulation member can have a uniform thickness. Thus, the thickness of an insulation wall including the vacuum insulation member can be reduced.

In addition, because the envelope is supported by the core including the laminated mesh members, a generation of creases on the surface of the envelope can be considerably restrained. Thus, when the vacuum insulation member is attached to a surface of an object, a generation of a defective bonding that the vacuum insulation member is separated from the surface of the object resulting from its expansion according to an introduction of a blowing agent into a gap between creases of the envelope can be considerably reduced.

The foregoing and other objects, features, aspects and advantages of the present invention will become more apparent from the following detailed description of the present invention when taken in conjunction with the accompanying drawings.

BEST MODE FOR CARRYING OUT THE INVENTION

Exemplary embodiments of the present invention will now be described in detail with reference to the accompanying drawings.

Figure 1:
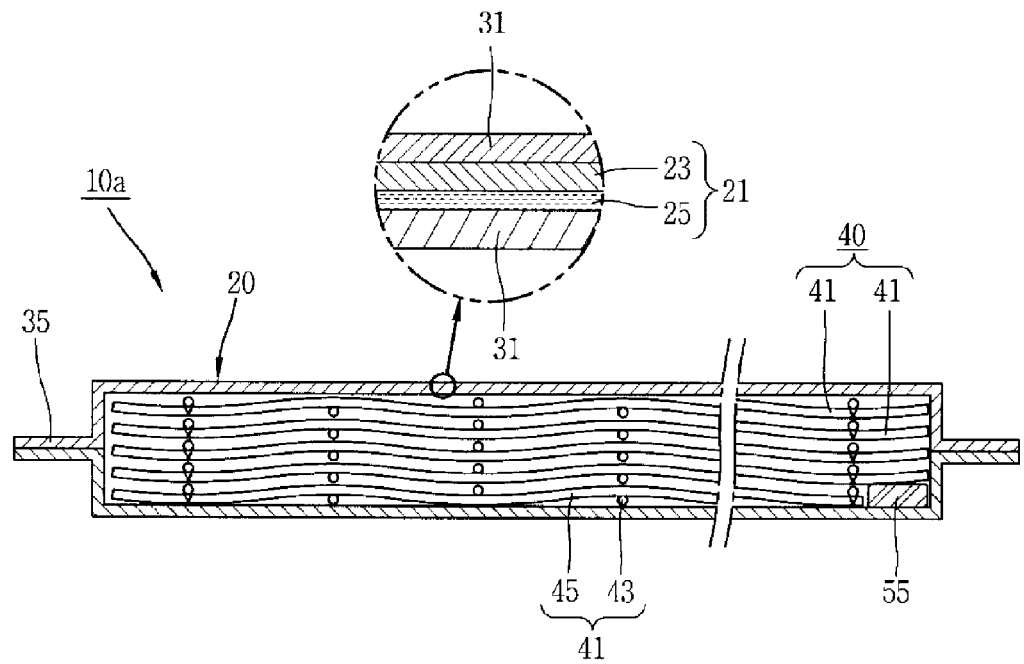
FIG. 1 is a sectional view showing a vacuum insulation member according to a first exemplary embodiment of the present invention.
Figure 2:
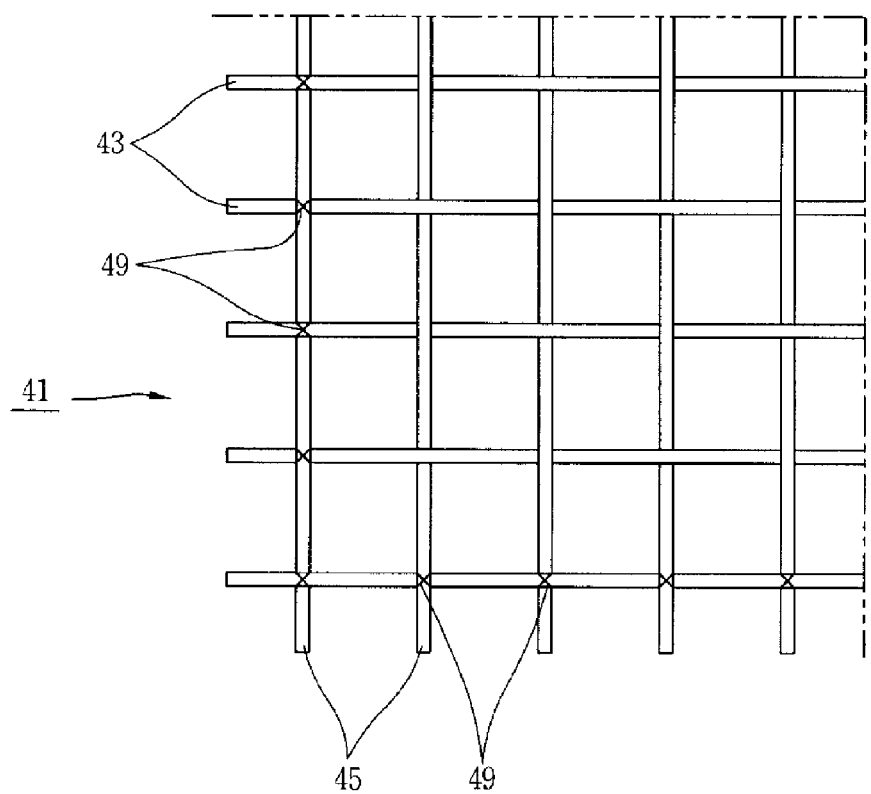
FIG. 2 is a plan view of a mesh member of FIG. 1.
Figure 3:
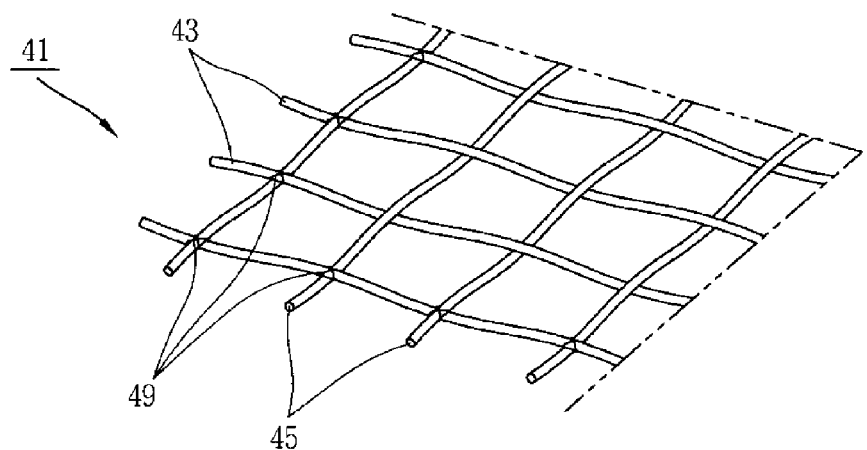
FIG. 3 is a view for explaining the process of bonding first and second wires of FIG. 2.

FIG. 1 is sectional view showing a vacuum insulation member according to a first exemplary embodiment of the present invention, FIG. 2 is a plan view of a mesh member of FIG. 1, and FIG. 3 is a view for explaining the process of bonding first and second wires of FIG. 2.

As shown in FIG. 1, a vacuum insulation member 10a according to the present exemplary embodiment includes an envelope 20 having gas impermeability and having a certain decompressed space therein, and a core 40 including a plurality of laminated mesh members 41 to support the envelope 20 at an outer side of the envelope 20. Here, the decompressed space may be a space in which internal pressure is decompressed to be lower than atmospheric pressure.

The envelope 20 may be configured to have an anti-air permeability or gas impermeability in order to form a decompressed space having a certain vacuum degree therein. The envelope 20 may include a plurality of films 21 and 31 which are laminated to each other. A junction part 35 may be formed on at least one side of the envelope 20 by bonding the films 21 and 31 at upper and lower sides after the core 40 is accommodated.

An internal vacuum degree of the envelope 20 may be maintained at $10^{-4}$ Torr to $10^{-2}$ Torr. To this end, the envelope 20 may be configured to include a metal laminated film 21 formed by laminating a metal to have the gas impermeability (anti-air permeability). The metal laminated film 21 may be configured to include a film main body 23 formed as a synthetic resin film and a laminated layer 25 formed by laminating a metal (e.g., aluminum (Al)) on the surface of the film main body 23.

The envelope 20 may further include resin films 31 disposed at an outer side and/or at an inner side of the metal laminated film 21. The resin films 31 may be made of polypropylene having excellent chemical resistance.

A getter 55 may be provided at the inner side of the envelope 20 in order to absorb a gas remaining at the inner side of the envelope 20 or a gas introduced into the interior of the envelope 20 from an outside. The getter 55 may be configured to include at least one of BaLi, CoO, BaO, and CaO in order to absorb oxygen, hydrogen, nitrogen, carbon dioxide, and vapor. Here, the getter 55 may be configured to have the shape of a certain block or a rectangular parallelepiped. Also, the getter 55 may be coated on an inner surface of the envelope or the surface of the core 20.

The core 40 for supporting the envelope 20 may be provided at the inner side of the envelope 20 in order to form and support a decompressed space having a certain vacuum degree.

The core 40 may be configured to include a plurality of laminated mesh members 41. Accordingly, the use of glass fiber in forming the core 40 can be avoided, and thus, a preprocessing process (e.g., hot pressing or needle punching, and the like), for which much equipment and much time are required, is not necessarily performed to reduce the size and volume of the glass fiber core resulting from the use of the glass fiber core. Here, the number of the laminated mesh members 41 may be appropriately adjusted according to the thickness of the vacuum insulation member 10a.

In addition, because the deviation of the height (thickness) of the core 20 can be reduced, a uniform insulation thickness of the vacuum insulation member 10a can be obtained. Namely, when the related art glass fiber core is used, after an internal space of an envelope is exhausted and decompressed, the thickness of the vacuum insulation member is greatly changed (about 30 percent), while there is little change in the thickness of the vacuum insulation member 10a according to the present exemplary embodiment, obtaining the uniform thickness.

In addition, after the vacuum insulation member 10a is vacuumized, a generation of creases on the surface of the envelope 20 can be restrained. Accordingly, when the vacuum insulation member 10a is attached to an object (e.g., a wall surface of the main body of a refrigerator), a generation of a defective bonding that the vacuum insulation member 10a is detached from the object as a blowing agent is introduced through the gap resulting from the creases of the envelope 20 and expanded can be prevented.

As shown in FIG. 2, each of the mesh members 41 includes a plurality of first wires 43 disposed to be parallel to each other, and a plurality of second wires 45 disposed to cross the first wires 43. Thus, the porosity, and the distance between layers of the mesh members 41 can be adjusted by adjusting the thickness and/or interval of the respective wires 43 and 45. By doing that, a structural strength, thermal conductivity, an internal vacuum pressure, and reliability (life span) can be optimized.

The first wire 43 and the second wire 45 may be configured to have a diameter (width) of about 1 mm, and the interval between the first wire 43 an the second wire 45 may range from 1 cm to 3 cm. Here, the diameter (width) and the disposition interval of the first wire 43 and the second wire 45 can be appropriately adjusted.

Here, the first wire 43 and the second wire 45 may be made of a synthetic resin material (for example, polypropylene (PP), polyethylene (PE), polycarbonate (PC), and the like).

In addition, the first wire 43 and the second wire 45 may be made of a metal (for example, copper, aluminum, iron, and the like). In the present exemplary embodiment, the case in which the first wire 43 and the second wire 45 are made of a synthetic resin material will be described as an example.

The first wire 43 and the second wire 45 may be formed through extrusion, whereby a fabrication cost can be reduced.

The mesh member 41 may include a fixing part 49 for fixing the first wire 43 and the second wire 45. Accordingly, the strength for maintaining the shape and the supporting force can be increased.

The fixing part 49 may be formed at each crossing of the first wire 43 and the second wire 45. The fixing part 49 may be configured to fix the first wire 43 and the second wire 45 through bonding and/or binding. In more detail, the fixing part 49 may be formed by coating an adhesive material at the mutual contact area of each crossing of the first wire 43 and the second wire 45. Also, the fixing part 49 may be formed by thermally bonding the mutual contact area of each crossing of the first wire 43 and the second wire 45 through radio frequency (RF) processing. In addition, the fixing part 49 may be configured by binding the mutual contact area of each of the crossing of the through RF process with a wire, a tape, and the like.

The fixing part 49 may be formed at an end portion of each of the first wire 43 and the second wire 46. In this case, because only the crossing of the end portion of each of the first wire 43 and the second wire 46 may be fixed while other crossings may be supported by frictional force between the respective wires, whereby the number of the fixing parts 49 can be reduced while securing the shape maintaining strength and the supporting force, thus facilitating the fabrication.

As shown in FIG. 3, the first wires 43 and the second wires 45 of the mesh member 41 may be disposed alternately along a vertical direction on the drawing. Thus, a heat transmission among the first wires 43 and the second wires 45 can be restrained. Also, heat transmitted among the respective wires can be quickly spread.

In more detail, the first wires 43 are coupled to the second wires 45 in such a manner that the first wires 43 cross the second wires 45 at an upper side at one time and cross the second wires 45 at a lower side at another time, and the second wires 45 are coupled to the first wires 43 in such a manner that the second wires 45 cross the first wires 43 at an upper side at one time and cross the first wires 43 at a lower side at another time.

Here, the first wire 43 and the second wire 45 of the mesh member 41 may have a circular section. Accordingly, the first wire 43 and the second wire 45 of the mesh member 41 are in point-contact with each other, thus restraining a heat transmission among the first wire 43 and the second wire 45.

In addition, at least one of the first wire 43 and the second wire 45 may have a polygonal section. Then, the contact area between the first wire 43 and the second wire 45 can be increased to prevent a slip between the wires.

With such a configuration, when the envelope 20 and the mesh member 41 are formed, respectively, the mesh member 41 is laminated at the inner side of the envelope 20. And then, the getter 55 is disposed at the inner side of the envelope 20. The interior of the envelope 20 is decompressed to maintain a certain vacuum degree in the interior of the envelope 20, and then hermetically sealed.

Figure 4:
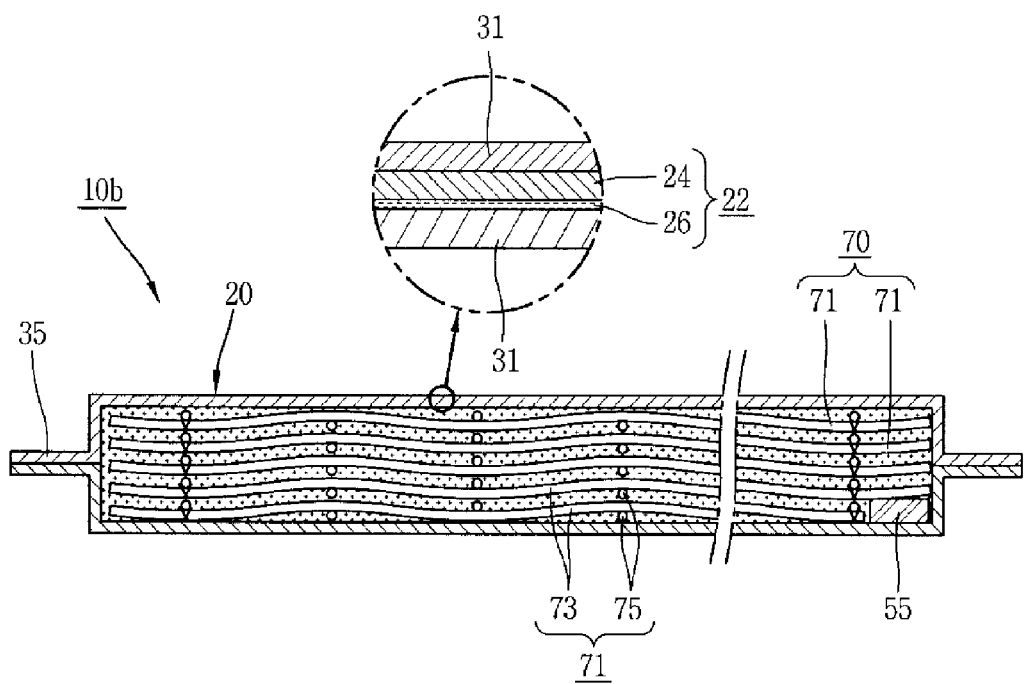
FIG. 4 is a sectional view of a vacuum insulation member according to a second exemplary embodiment of the present invention.
Figure 5:
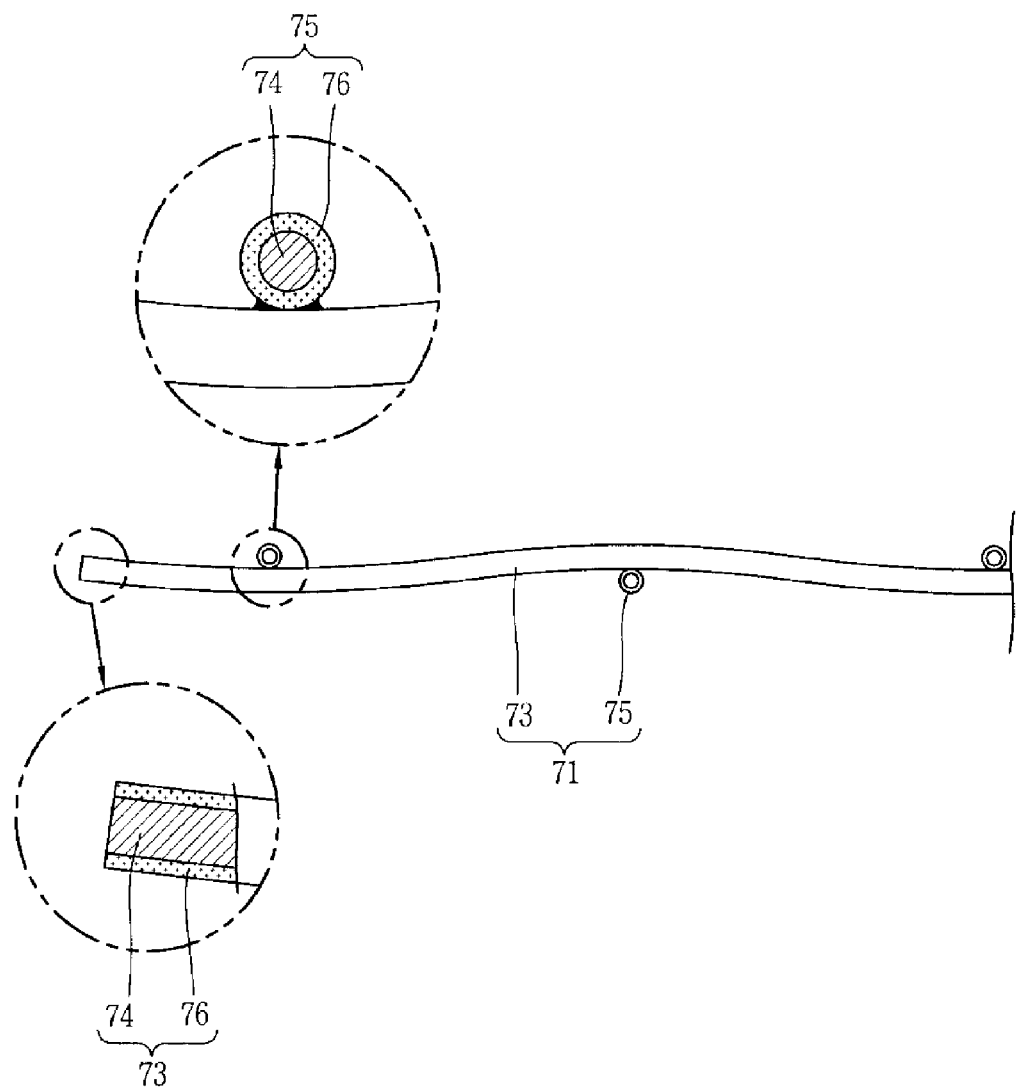
FIG. 5 is an enlarged view of a portion of the first and second wires of FIG. 4.

FIG. 4 is a sectional view of a vacuum insulation member according to a second exemplary embodiment of the present invention, and FIG. 5 is an enlarged view of a portion of the first and second wires of FIG. 4.

As shown in FIGS. 4 and 5, the same reference numerals are used for the same and equivalent parts of the foregoing configurations for the sake of explanation of the drawings, and a repeated description of some elements will be omitted. The vacuum insulation member 10a according to the present exemplary embodiment includes the envelope 20 having gas impermeability and having a certain decompressed space therein, and a core 70 including a plurality of laminated mesh members 71 to support the envelope 20 at an outer side of the envelope 20.

The envelope 20 may be configured to have gas impermeability in order to form a decompressed space having a certain vacuum degree therein. The envelope 20 may include a plurality of films 22 and 31 which are laminated to each other. A junction part 35 may be formed on at least one side of the envelope 20.

The core 70 for supporting the envelope 20 may be provided at the inner side of the envelope 20 in order to form and support a decompressed space having a certain vacuum degree.

The getter 55 may be further provided at the inner side of the envelope 20 in order to absorb a gas at the inner side of the envelope 20.

The core 70 may be configured to include a plurality of laminated mesh members 41. Accordingly, the use of glass fiber in forming the core 70 can be avoided, and thus, a preprocessing process (e.g., hot pressing or needle punching, and the like), for which much equipment and much time are required, is not necessarily performed to reduce the size and volume of the glass fiber core resulting from the use of the glass fiber core. Here, the number of the laminated mesh members 41 may be appropriately adjusted according to the thickness of the vacuum insulation member 10a.

In addition, because the deviation of the height (thickness) of the core 20 can be reduced, a uniform insulation thickness of the vacuum insulation member 10a can be obtained.

In addition, after the vacuum insulation member 10a is vacuumized, a generation of creases can be restrained. Accordingly, when the vacuum insulation member 10a is attached to an object (e.g., a wall surface of the main body of a refrigerator), a generation of a defective bonding that the vacuum insulation member 10a is detached from the object due to the creases of the envelope 20 can be prevented.

As shown in FIGS. 4 and 5, each of the mesh members 71 includes a plurality of first wires 73 disposed to be parallel to each other, and a plurality of second wires 75 disposed to cross the first wires 73.

The first wire 73 and the second wire 75 may be configured to include a central metal part 74 and a synthetic resin unit 76 coated on the circumference of the central metal part 74. Here, the metal part 74 may be made of a metal (copper, aluminum, iron, and the like) having a certain diameter.

The first wire 73 and the second wire 75 may be disposed alternately along the vertical direction on the drawing. Thus, the first wire 73 and the second wire 75 of the mesh member 71 are in point-contact with each other, thus restraining a heat transmission among the first wire 73 and the second wire 75.

Each mesh member 71 may include a fixing part 79 for fixing the first wire 73 and the second wire 75 disposed to cross each other. The fixing part 79 may be formed at each crossing of the first wire 43 and the second wire 45. The fixing part 79 may be formed at the crossing of the first wire 73 and the second wire 75. The fixing part 79 may be configured to fix the first wire 73 and the second wire 75 through bonding and/or binding.

In more detail, the fixing part 79 may be formed by thermally bonding the mutual contact area of each crossing of the first wire 73 and the second wire 75 through radio frequency (RF) processing. Also, the fixing part 79 may be formed by coating an adhesive material at the mutual contact area of each crossing of the first wire 43 and the second wire 45. In addition, the fixing part 79 may be configured by binding the mutual contact area of each of the crossing of the through RF process with a wire, a tape, and the like. The fixing part 79 may be formed at an end portion of one of the first wire 73 and the second wire 75. Accordingly, the number of fixing parts 79 can be reduced, while the first wire 73 and the second wire 75 secure the support (coupling) strength enough to maintain the form.

A filler 50 formed as powder of an inorganic compound having micro pores may be provided at the inner side of the envelope 20. The filler 50 may be configured to include at least one of silicon dioxide ($SiO_2$), titanium dioxide ($TiO_2$), or aluminum oxide (alumina, $AlO_3$). The filler 50 may be configured to include at least one of aerogel and fumed silica. Accordingly, a heat transmission at the internal space of the envelope 20 can be restrained. Namely, the internal space of the envelope 20 and the core 70 can be filled with the filler 50 formed as inorganic compound powder, thus lengthening a heat transmission path according to conduction and restraining a heat transmission due to a convection current and radiation.

Accordingly, the envelope 20 can be configured to have relatively low barrier characteristics. An internal vacuum degree of the envelope 20 may be configured to be maintained at $10^{-1}$ Torr to 10 Torr.

As shown in FIG. 1, the envelope 20 may be configured to include a deposition film 22 by depositing a metal or an inorganic material on a surface. The deposition film 22 may be configured to include a film main body 24 made of a synthetic resin material and a deposition layer 26 formed by depositing a metal (e.g., aluminum) or an inorganic material (e.g., silica) on the surface of the film main body 24. Accordingly, when the envelope 20 is configured, the use of a metal laminated film formed by laminating a metal (aluminum) can be avoided, and thus, a heat transmission by the metal (aluminum) laminated film can be prevented. Here, as for the deposition film 22, the thickness of the deposition layer 26 formed by depositing the metal (aluminum) or the inorganic material on the outer surface of the film main body 24 made of a synthetic resin material is considerably smaller than the thickness (e.g., 6 mm) of the aluminum laminated layer, so heat transmission through the envelope 20 can be effectively restrained.

The envelope 20 may further include resin films 31 disposed at an outer side and/or at an inner side of the deposition film 22. The resin films 31 may be made of polypropylene having excellent chemical resistance.

With such a configuration, when the envelope 20 and the mesh members 71 is formed, respectively, the mesh members 71 are laminated at the inner side of the envelope 20. And then, the getter and/or the filler 50 are disposed at the inner side of the envelope 20. Thereafter, the interior of the envelope 20 is decompressed to maintain a certain vacuum degree and then hermetically sealed.

As described above, in the present exemplary embodiment, the use of the glass fiber core is avoided, and the core 70 formed by laminating the mesh members 71 and the filler 50 of powder having micro pores are charged in the interior, thus the internal vacuum degree of the envelope 20 can be maintained to be relatively low (e.g., $10^{-1}$ Torr to 10 Torr).

In case of using glass fiber core, a relatively high internal vacuum degree (e.g., $10^{-4}$ Torr to $10^{-2}$ Torr) is required in terms of glass fiber, but in the case of the core 70 according to the present exemplary embodiment, a relatively low vacuum degree (e.g., $10^{-1}$ Torr to 10 Torr) can be maintained. Thus, when the interior of the envelope 20 is vacuumized, introduction of equipment (vacuum pump, and the like) can be reduced and a tact time can be considerably reduced.

In detail, in order to make the interior of the core 20 have the vacuum degree of $10^{-2}$ Torr or lower ($10^{-4}$ Torr to $10^{-2}$ Torr), a very large pumping capacity is required, for which at least three pumps must be connected in series (or by stages). In this case, the pumps have a large capacity and are high-priced, and a tact time required for reaching a vacuum degree of a desired level is considerably lengthened, degrading the productivity. In comparison, in the present exemplary embodiment, in order to maintain the vacuum degree of $10^{-2}$ Torr or higher ($10^{-1}$ Torr to 10 Torr) in the interior of the vacuum insulation material 10b, a high capacity, high-priced pump is not required and the vacuum degree of a desired level can be reached within a relatively short time.

A refrigerator having a vacuum insulation member according to an exemplary embodiment of the present invention will now be described with reference to FIG. 6.

Figure 6:
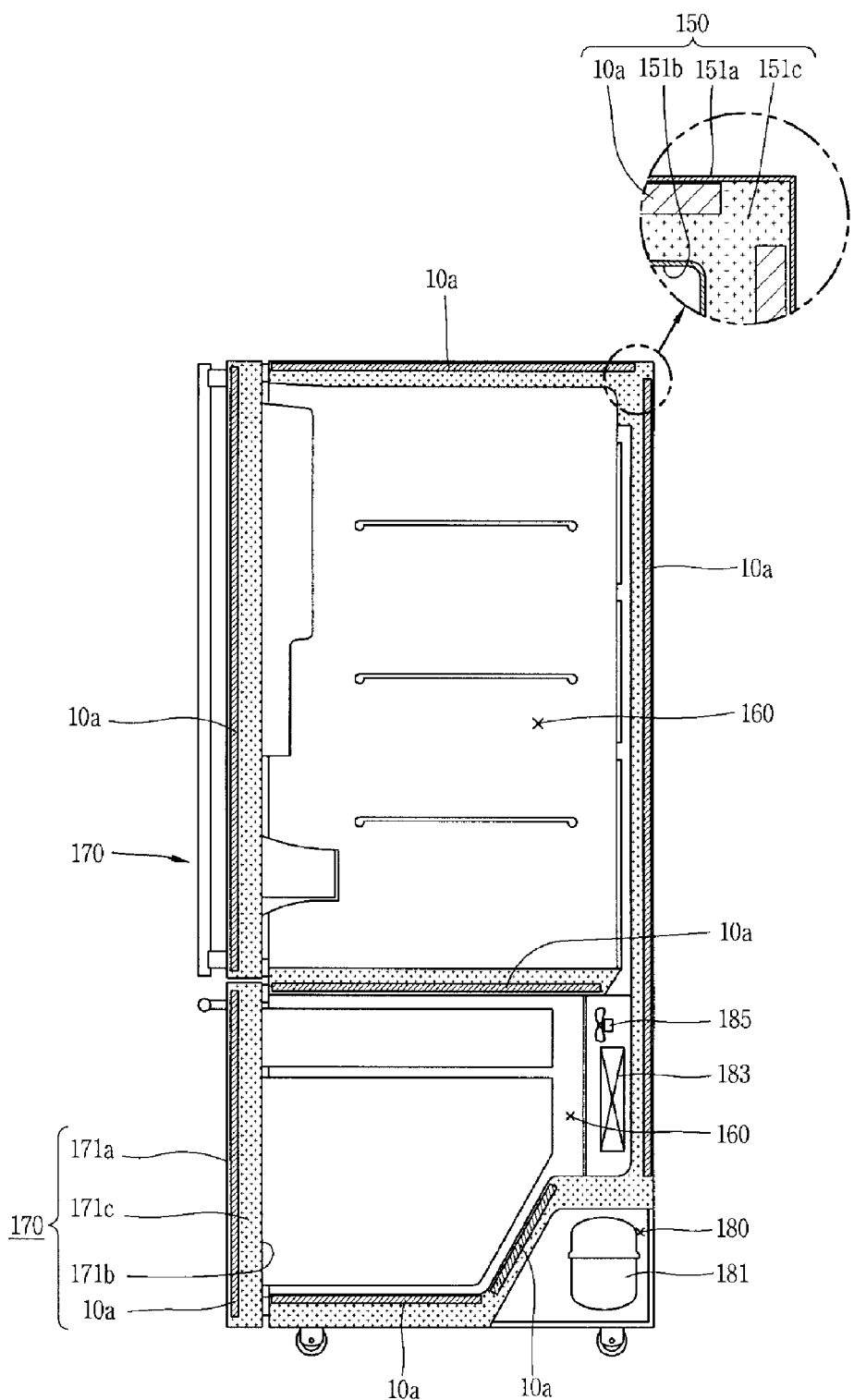
FIG. 6 is a sectional view of a refrigerator having a vacuum insulation member according to an exemplary embodiment of the present invention.

FIG. 6 is a sectional view having a vacuum insulation member according to an exemplary embodiment of the present invention.

As shown in FIG. 6, a refrigerator having a vacuum insulation member may be configured to include a refrigerator main body 150 forming a cooling chamber therein, a door 170 for opening and closing the cooling chamber 160, and a vacuum insulation member 10a provided at the refrigerator main body 150 or the door 170. Here, the cooling chamber 160 is a general term for a freezing chamber and a refrigerating chamber, and the refrigerator main body 150 may be configured to include one of the freezing chamber and refrigerating chamber.

The vacuum insulation member 10a may be configured to include the envelope 20 having gas impermeability and having a certain decompressed space therein, and the core 40 including a plurality of laminated mesh members 41 to support the envelope 20 at an outer side of the envelope 20. Here, the vacuum insulation member 10a may be configured to further include the filler 50 formed as powder having micro pores and accommodated in the interior of the envelope 20. Also, the vacuum insulation member 10a may be further include the getter 55 disposed at the inner side of the envelope 20 to absorb an internal gas. Here, the vacuum insulation member 10a may be configured to have the configuration of the vacuum insulation members 10a and 10b as described above with reference to FIGS. 1 to 5.

The refrigerator main body 150 includes an outer case 151a forming an external appearance and an inner case disposed to be spaced apart with a charging interval of an insulation member (blowing agent) 151c at an inner side of the outer case 151a and forming the cooling chamber 160 therein.

The refrigerator main body 150 may include a refrigerating cycle for providing cooling air to the cooling chamber 160. A mechanic chamber 180 may be formed at a lower region of a rear side of the refrigerator main body 150. The mechanic chamber 180 may include a partial configuration of the refrigerating cycle including a compressor 181, a condenser, and the like, and an evaporator 183 may be provided at one side of the interior of the cooling chamber 160. A cooling fan 185 may be provided at one side of the evaporator 183.

The vacuum insulation member 10a may be provided on at least one side wall of the refrigerator main body 150. Thus, the thickness of the corresponding side wall can be reduced, and accordingly, the internal space of the refrigerator can be increased as much with the same external appearance (size) maintained.

The door 170 may include an outer door plate 171a forming an external appearance and an inner door plate 171b spaced apart with a charging interval of the insulation member (blowing agent) 171c from the outer door plate 171a at an inner side of the outer door plate 171a.

The door 170 may include the vacuum insulation member 10a. The vacuum insulation member 10a may be provided between the outer door plate 171a and the inner door plate 171b. Accordingly, the thickness of the door 170 can be reduced.

Here, because the vacuum insulation member 10a may be configured such that the envelope 20 is supported by the core 40 formed as a structure having a certain shape, the vacuum insulation member 10a can have a uniform thickness. Thus, because the uniform vacuum insulation thickness is secured, the thickness of the side wall of the refrigerator can be reduced as much. Namely, in the related art vacuum insulation member, it has a large thickness deviation, so the thickness of the blowing agent is set based on the smallest portion of the thickness of the vacuum insulation member, causing a problem in that the thickness of the side wall of the cooling chamber 160 increases overall. In comparison, however, according to the present exemplary embodiment, the vacuum insulation member 10a has a uniform thickness, so the side wall of the cooling chamber 160 can be formed to be thinner overall, and thus, the internal space of the refrigerator can be increased as much.

In addition, because the vacuum insulation member 10a may be configured such that the envelope 20 is supported by the core 20 formed as a structure having a certain shape, a generation of creases on the surface of the envelope 20 can be restrained. Thus, when the vacuum insulation member 10a is bonded to an object, a defective bonding caused by a generated crease can be restrained.

In more detail, when the refrigerator main body 150 is fabricated, the vacuum insulation member 10a is disposed between the outer case 151a and the inner case 151b and fixed to one of the outer case 151a and the inner case 151b before a foaming operation of the refrigerator main body 150. When the vacuum insulation member 10a is fixed, the blowing agent (polyurethane, and the like) is injected between the outer case 151a and the inner case 151b.

The blowing agent injected into the interior between the outer case 151a and the inner case 151b expands while flowing within the internal space between the outer case 151a and the inner case 151b. In this case, because there are little creases on the surface of envelope of the vacuum insulation member 10a, vacuum insulation member 10a can be completely tightly attached to the surface of the object (e.g., the outer case 151a or the inner case 151b). Accordingly, the blowing agent is prevented from being introduced to between the vacuum insulation member 10a and the object, restraining a generation of a defective bonding that the vacuum insulation member 10a is detached from the object. In comparison, in the related art vacuum insulation member, because creases are generated on the envelope, when the vacuum insulation member is attached to the surface of the object (the outer case 151a or the inner case 151b), a gap due to the creases is generated between the vacuum insulation member and the object and the blowing agent will be introduced through the gap so as to be expanded, causing the defective attachment problem in that the vacuum insulation member is separated from the surface of the object.

FIGS. 1 to 3 illustrate that the wire is made of a synthetic resin material, but it may be also configured as a wire including the metal part and the synthetic resin part as illustrated in FIGS. 4 and 5. Also, FIGS. 4 and 5 illustrate that the mesh members are formed by wires including the metal part and the synthetic resin part, but the mesh members may be also configured with the wire made of a synthetic resin material as illustrated in FIGS. 1 to 3.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A vacuum insulation member comprising:
   an envelope including a plurality of films whose edges are bonded to each other to form a decompressed space therein; and
   a core including a plurality of mesh members stacked on each other to support the envelope at an inner side of the envelope,
   wherein each of the mesh members comprises a plurality of first wires disposed to be parallel to each other; a plurality of second wires disposed parallel to each other and crossing the first wires; and a fixing part to fix the first wires and the second wires, and
   wherein the fixing part is formed at a crossing of an end portion of each of the first wires with the second wires and other crossings are supported by frictional force between the respective wires.

2. The vacuum insulation member of claim 1, wherein the first wire and the second wire is formed through extrusion.

3. The vacuum insulation member of claim 1, wherein the first wires and the second wires are made of a synthetic resin material.

4. The vacuum insulation member of claim 1, wherein the first wires and the second wires are configured to be in point-contact with each other.

5. The vacuum insulation member of claim 1, wherein the first wires and the second wires are configured to be alternately disposed along a vertical direction.

6. The vacuum insulation member of claim 1, wherein the first wires and the second wires comprise a metal part disposed at the center and a synthetic resin part coated on an outer surface of the metal part.

7. The vacuum insulation member of claim 1, further comprising:
   a getter for absorbing a gas at an inner side of the envelope.

8. The vacuum insulation member of claim 7, wherein the getter is coated on an inner surface of the envelop or the surface of the core.

9. The vacuum insulation member of claim 1, wherein an internal vacuum degree of the envelope ranges from $10^{-4}$ Torr to $10^{-2}$ Torr.

10. The vacuum insulation member of claim 9, wherein the envelope comprises a film main body and a metal laminating film including a laminated layer formed by laminating a metal on a surface of the film main body.

11. The vacuum insulation member of claim 1, further comprising:
    a filter formed as powder having micro pores and filled at the inner side of the envelope.

12. The vacuum insulation member of claim 11, wherein the filler comprises at least one of $SiO_2$, $TiO_2$, and $Al_2O_3$.

13. The vacuum insulation member of claim 11, wherein the filter comprises any one of aerogel and fumed silica.

14. The vacuum insulation member of claim 11, wherein an internal vacuum degree of the envelope ranges from $10^{-1}$ Torr to 10 Torr.

15. The vacuum insulation member of claim 14, wherein the envelope is configured a film main body and a deposition film including a deposition layer formed by depositing a metal or an inorganic material on an outer surface of the film main body.

16. A refrigerator having the vacuum insulation member of claim 1.

17. The vacuum insulation member of claim 1, wherein the fixing part is formed at a crossing of an end portion of each of the second wires with the first wires.

* * * * *